United States Patent
Huang

(10) Patent No.: US 7,251,314 B2
(45) Date of Patent: Jul. 31, 2007

(54) VOICE MESSAGE TRANSFER BETWEEN A SENDER AND A RECEIVER

(75) Inventor: Dawei Huang, Brisbane (AU)

(73) Assignee: Lucent Technologies, Murray Hill, NJ (US)

( * ) Notice: Subject to any disclaimer, the term of this patent is extended or adjusted under 35 U.S.C. 154(b) by 218 days.

(21) Appl. No.: 10/134,192

(22) Filed: Apr. 29, 2002

(65) Prior Publication Data

US 2003/0202641 A1    Oct. 30, 2003

(30) Foreign Application Priority Data

Apr. 26, 2002 (CN) .............................. 02 1 18393

(51) Int. Cl.
   *H04M 11/00* (2006.01)
   *H04M 11/10* (2006.01)
   *H04L 12/28* (2006.01)

(52) U.S. Cl. .............. 379/88.13; 379/88.17; 379/88.18; 455/413; 370/412

(58) Field of Classification Search ............ 379/88.13, 379/88.16–88.18, 88.1, 67.1, 266.1, 93.01, 379/93.06, 93.08–93.09, 93.24, 265.09, 406.09, 379/88.14, 88.19; 455/445, 464, 466, 296, 455/412; 370/352, 466, 231; 709/206, 219; 704/230

See application file for complete search history.

(56) References Cited

U.S. PATENT DOCUMENTS

| | | | |
|---|---|---|---|
| 5,610,970 A * | 3/1997 | Fuller et al. ............ 455/417 |
| 5,751,907 A | 5/1998 | Moebius et al. ............ 704/267 |
| 5,752,191 A * | 5/1998 | Fuller et al. ................ 455/445 |
| 5,790,978 A | 8/1998 | Olive et al. ................. 704/207 |
| 5,933,477 A * | 8/1999 | Wu ......................... 379/88.26 |
| 5,963,617 A * | 10/1999 | Kim ......................... 379/67.1 |
| 6,085,231 A * | 7/2000 | Agraharam et al. ........ 709/206 |
| 6,147,977 A * | 11/2000 | Thro et al. ................. 370/265 |
| 6,272,464 B1 | 8/2001 | Kiraz et al. ................. 704/257 |
| 6,351,523 B1 * | 2/2002 | Detlef ...................... 379/88.14 |
| 6,532,230 B1 * | 3/2003 | Lung et al. ................. 370/352 |
| 6,636,733 B1 * | 10/2003 | Helferich ................. 455/412.2 |
| 6,826,407 B1 * | 11/2004 | Helferich .................. 455/466 |
| 6,857,008 B1 * | 2/2005 | Shenefiel .................... 709/219 |
| 2001/0027392 A1 * | 10/2001 | Wiese, Jr. ................... 704/230 |
| 2002/0085541 A1 * | 7/2002 | Migimatsu .................. 370/352 |
| 2002/0120697 A1 * | 8/2002 | Generous et al. ........... 709/206 |
| 2002/0131566 A1 * | 9/2002 | Stark et al. .............. 379/88.19 |
| 2002/0176361 A1 * | 11/2002 | Wu et al. ................... 370/231 |
| 2004/0014456 A1 * | 1/2004 | Vaananen ................... 455/413 |

* cited by examiner

*Primary Examiner*—Fan Tsang
*Assistant Examiner*—Lisa Hashem

(57) ABSTRACT

A method and system forwards voice messages from a sender to a receiver through a network. A voice-mail device records a phone number of a receiver and a voice message of a sender within a digital file. The voice message and phone number are encapsulated within an e-mail, which is forwarded through a network to another voice-mail device that acts as a gateway. The e-mail is opened to obtain the phone number of the receiver and the voice message, and the phone number of the receiver is dialed to deliver the voice message to the receiver via a telephone network.

27 Claims, 4 Drawing Sheets

VOICE MESSAGE TRANSFER BETWEEN A SENDER AND A RECEIVER

FIELD OF THE INVENTION

This invention relates to telecommunication systems, and more particularly, this invention relates to telecommunication systems that forward voice messages through a network using phone and e-mail.

BACKGROUND OF THE INVENTION

For delivering messages over long distances or among international countries, several communication systems have been developed by those skilled in the art. A first communications system is the traditional telephone communications system using the Public Switched Telephone Network (PSTN). A second communication system is the recently developed system using Voice Over Internet Phones (VoIP) for voice phone calls. The third communication system is the common e-mail transmission, which is used by millions everyday. A fourth communication system is known as Fone2web™, also referred to as Phone2web.

As known to those skilled in the art, Fone2web™ is an internet voice communication system that enables telephone users to exchange voice messages with personal computer users. The system bridges phone users to the internet for voice communications with e-mail users. It has been developed by Fone2web.com in Silicon Valley, Calif., and includes a Chincom Group Corporation as a China division. In this type of system, it is possible to use phone-to-phone, phone-to-PC, and PC-to-phone communications.

In a phone-to-phone communication, a voice message is sent to another Fone2web™-by-phone user over the internet. A server accepts the message, routes the message to another server nearest the destination, and drops the message to the recipient's Fone2web™-by-phone box. In this system it is also possible to use a telephone to send a voice message to anyone in the world who has a regular e-mail box. The voice message will be delivered to the recipient's regular e-mail box. The recipient would see the icon for the voice message and click the attachment file. At this time, a "phone-to-web VE mailer™ will appear and play the message. It is also possible to send voice messages to any e-mail box in the world, and also broadcast to a list of audiences. Messages can also be stored.

Ordinary long or international distance phone calls provide a convenient and high quality two-way communications for millions of everyday users. This type of communication system, however, is still expensive because it uses circuit switching techniques with expensive digital switches and sometimes local loop carriers. VoIP, on the other hand, uses economy packet switching to communicate, but requires expensive equipment, making this communication system prohibitively expensive in some cases. Also, the quality of the voice is poor in comparison to standard long distance or international calls.

As those skilled in the art understand, e-mail has been the most successful application on the Internet. It is inexpensive and provides faster delivery than ordinary mail. An e-mail user only requires a computer connecting to the Internet in some manner. It still typically requires the use of computer for e-mail communications, however.

In recent years, many efforts have been placed on using cellular phones or a personal digital assistants (PDA) to send/receive e-mail messages to obtain greater mobility to a user. But this is still not as convenient as sending voice. In particular, keying Chinese characters on a cellular phone or PDA is very difficult. Although recent developments of Fone2web™ delivers voice messages through the Internet, the system is expensive, and the delivered voice message is stored in a voice-mailbox. The receiver must retrieve the message by calling a voice-mailbox. The calling of a voice-mailbox is not convenient and prompt for some users.

SUMMARY OF THE INVENTION

It is therefore an object of the present invention to provide a system and method where users have the ability to send long distance and international voice messages through the internet to receivers while overcoming the drawbacks of the prior art.

The system and method of the present invention provides a voice-mail machine that allows subscribers to send long distance and international voice messages to receivers through the internet without using computers directly. The system is inexpensive, convenient, mobile and has high quality audio in the voice communications. Similar to e-mail and Fone2web™ communication systems, the system and method of the present invention provides a one-way communication system.

The present invention combines the communications of phone-email-phone. Standard phone calls can be used by both a sender and receiver with local connections to voice-mail machines. The message is sent between two voice-mail machines of the present invention by e-mail in one aspect of the present invention.

A method of the present invention forwards voice messages from a sender to a receiver through a network. A voice-mail device receives a call from a sender and records the phone number of a receiver and a voice message of the sender within the digital file. The voice message and phone number are encapsulated within an e-mail, which is forwarded from the voice-mail device through a network to another voice-mail device. The e-mail is opened to obtain the phone number of the receiver and the voice message. The phone number of the receiver is dialed and the voice message delivered to the receiver via a telephone network.

In yet another aspect of the present invention, the voice-mail device can be called via a public switched telephone network for cellular telephone network. The voice-mail device can comprise a telephone switch, cellular base station or radio network center. The voice message can be delivered to the receiver via a public switched telephone network or cellular telephone network. The voice message can be forwarded to a receiver as digital voice and e-mails can be forwarded through a network, such as the internet, using a simple mail transfer protocol. The voice message can be recorded at a voice-mail device as a wave file.

In yet another aspect of the present invention, it is possible to decide whether to forward any one-way voice messages on the basis of prediction of near future channel capacities by a queuing model in wireless network systems. The voice-mail device is operative for (a) prompting and receiving a dial tone; (b) recording and playing a voice message; (c) locating an e-mail address; and (d) sending and receiving an e-mail. The voice message can be compressed at a voice-mail device using a recursive least square algorithm and a run length coding method.

A system is also disclosed for forwarding voice messages from a sender to a receiver through a network and includes a voice-mail device operative as a gateway within a network for receiving a voice message and phone number from a sender via a telephone network. The voice-mail device is operative for: (a) prompting and receiving a dial tone; (b) recording and playing a voice message; (c) locating an e-mail address; and (d) sending and receiving an e-mail to a receiver via an internet and telephone network.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
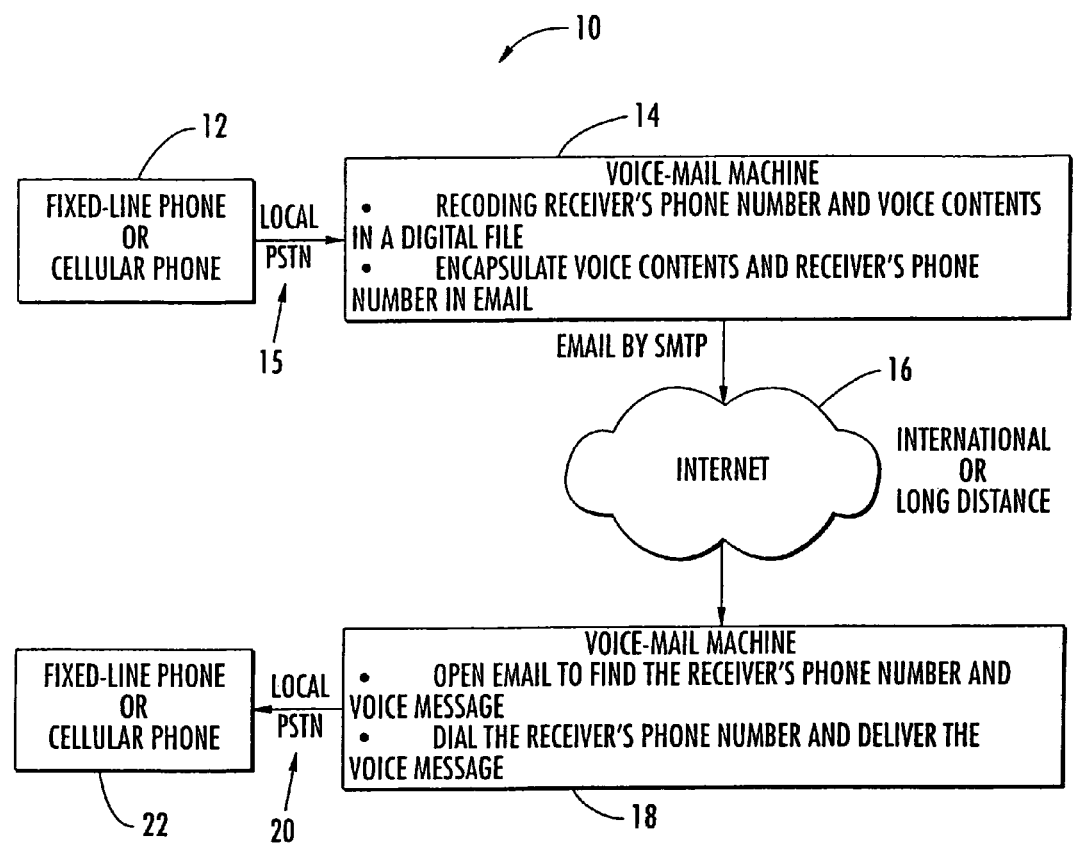
FIG. 1 is a block diagram where a first embodiment of the present invention showing a fixed-line phone or cellular phone operative with a voice-mail machine of the present invention and forwarding e-mail by SMTP through the internet.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention provides for low cost long distance and international communications having mobility and convenience without keying characters for e-mail communications. The present invention also allows cellular phone roaming without registration. It has advantages over the more conventional systems, including ordinary international and long distance phone calls, Voice over internet, e-mail, and Fone2web™ communications.

In the present invention, the internet is used for transferring voice messages. This use is inexpensive as compared to the more common switched circuit systems of ordinary phone calls. As compared to voice communications using internet phones, high quality sound is obtained with the present invention because the international standard μ-law (mμ-law) encoding is used.

As is known to those skilled in the art, mu-law encoding is a system for encoding audio signals using logarithmic quantization. More signals are statistically likely to be near a low signal level than a high signal level, and thus, there are more quantization points near a low level than a high level. In most mu-law systems, linear samples of 14-16 bits are compounded to eight bits. This is often used in telephone quality Codecs, such as a Spark workstation audio Codec.

Mu-law encoding is named from the use of a perceptual curve and auditory perception research. It is a non-linear pulse code modulation (PCM) on a logarithmic scale, which adds noise that is proportional to the signal strength. Sun Spark workstations AU format for some files is one popular example of the mu-law encoding. For example, eight-bit, mu-law encoding would cut one channel of compact disc (CD) audio down to about 350 Kbps.

As is known to those skilled in the art, the standard for pulse code modulation is ITUUG.711 and assigns a level to each sample at every $1/8,000$ sec. Only eight bits are sent to encode each sample such that only 256 different levels are encoded. This produces a channel rate of 64 Kbps. As known to those skilled in the art the quality of 8-bit μ-law signals is about equivalent to that of 12-bit PCM. It is more sensitive to changes at lower amplitude than high amplitude and represents speech, and uses more bits to encode at low amplitudes and fewer bits to encode at high amplitudes. This non-uniform quantization can be done in several ways, such as mu-law and a-law encoding.

Many encoders use time-frequency mapping such as using a filter bank or Fast Fourier Transform (FFT) that decomposes the input signal into sub-bands. The psycho-acoustic model looks at the sub-bands and the original signal and determines masking thresholds using psycho-acoustic information. Each of the sub-band samples is quantized and encoded to keep the quantization noise below the masking threshold. These quantized samples are assembled in the frames to be determined by the decoder. There is no requirement for psycho-acoustic model with decoding where the frames are unpacked and the sub-band samples are decoded. A frequency-time mapping then converts them into a single output audio signal.

In the present invention, the sound is played after a wave file is received, and thus, no delay in jitter occurs. There is also little difficulty during rush hours. It is advantageous over e-mail systems because it does not require the use of computers directly. There is no requirement for keying characters, which would be difficult for mobile users, especially those in China. It is also advantageous over phone-to-web communication systems because the present invention provides phone-to-phone communications without "fetching" messages from a mailbox.

The present invention uses a voice-mail machine, in accordance with the present invention, to allow subscribers to send voice messages to receivers at international distances through the internet without using computers directly. Throughout this description, the term "voice-mail machine" is used to describe the various processors and components having the functions of allowing users to send the voice-mail messages, in accordance with the present invention. It is a one-way communication similar to e-mail and phone-to-web communications. It combines the communications of phone-email-phone where a standard phone call is used for both sender and receiver local connections to voice-mail machines. The voice-mail machine can be part of a telephone switch or can be incorporated into the public switched telephone network.

In a first aspect of the present invention, as shown in FIG. 1, the communications system is illustrated at 10. A message is sent between two voice-mail machines by e-mail where a fixed-line phone or cellular phone 12 contacts the voice-mail gateway corresponding to the functions of a voice-mail machine 14 through the local PSTN 15. The receiver's phone number and voice contents are recorded in a digital file and the voice contents and receiver's phone number are encapsulated in an e-mail. The e-mail is sent through the internet 16 by Simple Mail Transfer Protocol (SMTP) via international or long distance connections to a voice-mail machine 18 having the functional gateway where the e-mail is opened to find the receiver's phone number and voice message. This is then forwarded through the local public switched telephone network 20 to the receiver's fixed-line phone or cellular phone 22 by dialing the receiver's phone number and delivering the voice message.

As known to those skilled in the art, the Simple Mail Transfer Protocol is based on TCP/IP protocol for sending e-mail between servers. Most e-mail systems that forward mail via the internet use SMTP with a POP3 (Post Office Protocol) server. The addressee retrieves the message from the POP3 server. Typically, it is necessary to specify both the POP3 server and the SMTP server when any e-mail client application is configured.

Figure 2:
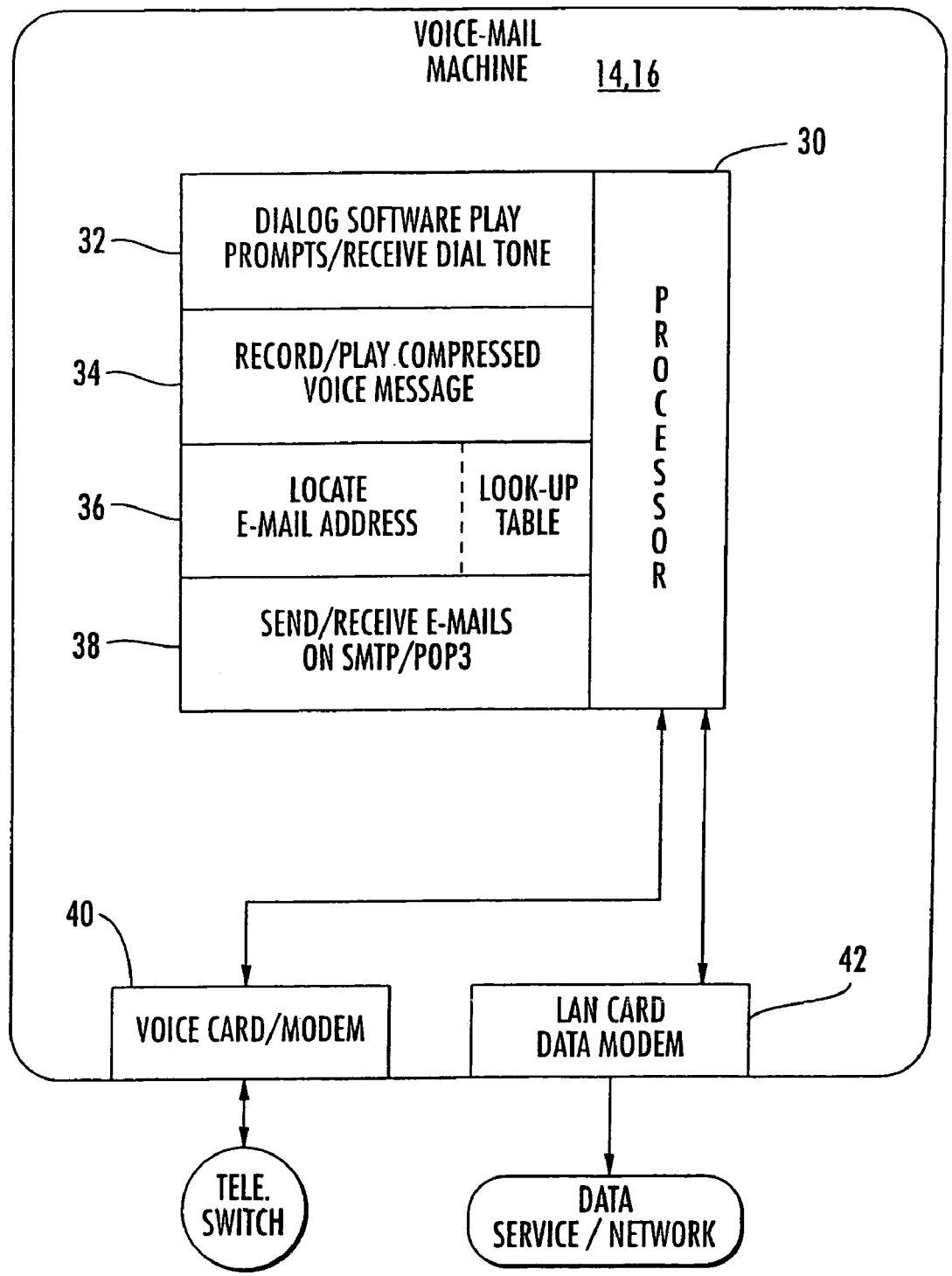
FIG. 2 is a high level block diagram of a voice-mail machine that can be used in the present invention.

As shown in FIG. 2, in one non-limiting example of the present invention, a voice-mail machine 14 includes a computer processor 30 that includes appropriate computer circuitry and four major software modules 32,34,36,38 developed by techniques known to those skilled in the art. A first software module 32 dialogs software by playing prompt sounds and receiving dialing tones. A second software module 34 records and plays compressed voice messages with encoding/decoding methods of the present invention. A third software module 36 incorporates a look-up table 36a for finding an e-mail address based on the receiver's country code and area code. A fourth software module 38 sends and receives e-mails on the basis of SMTP/POP3 protocol.

A voice card or voice modem 40 on the computer detects telephone call states by dialing tones. It converts analog voice to digital signals and plays digital voice signals. A LAN (Local Area Network) card or a data modem 42 on the computer can connect the machine with an e-mail user agent. Through the voice card or voice modem, the voice-mail machine connects to a standard telephone switch 44. A special service number and an e-mail address are allocated to the voice-mail machine.

Figure 3:
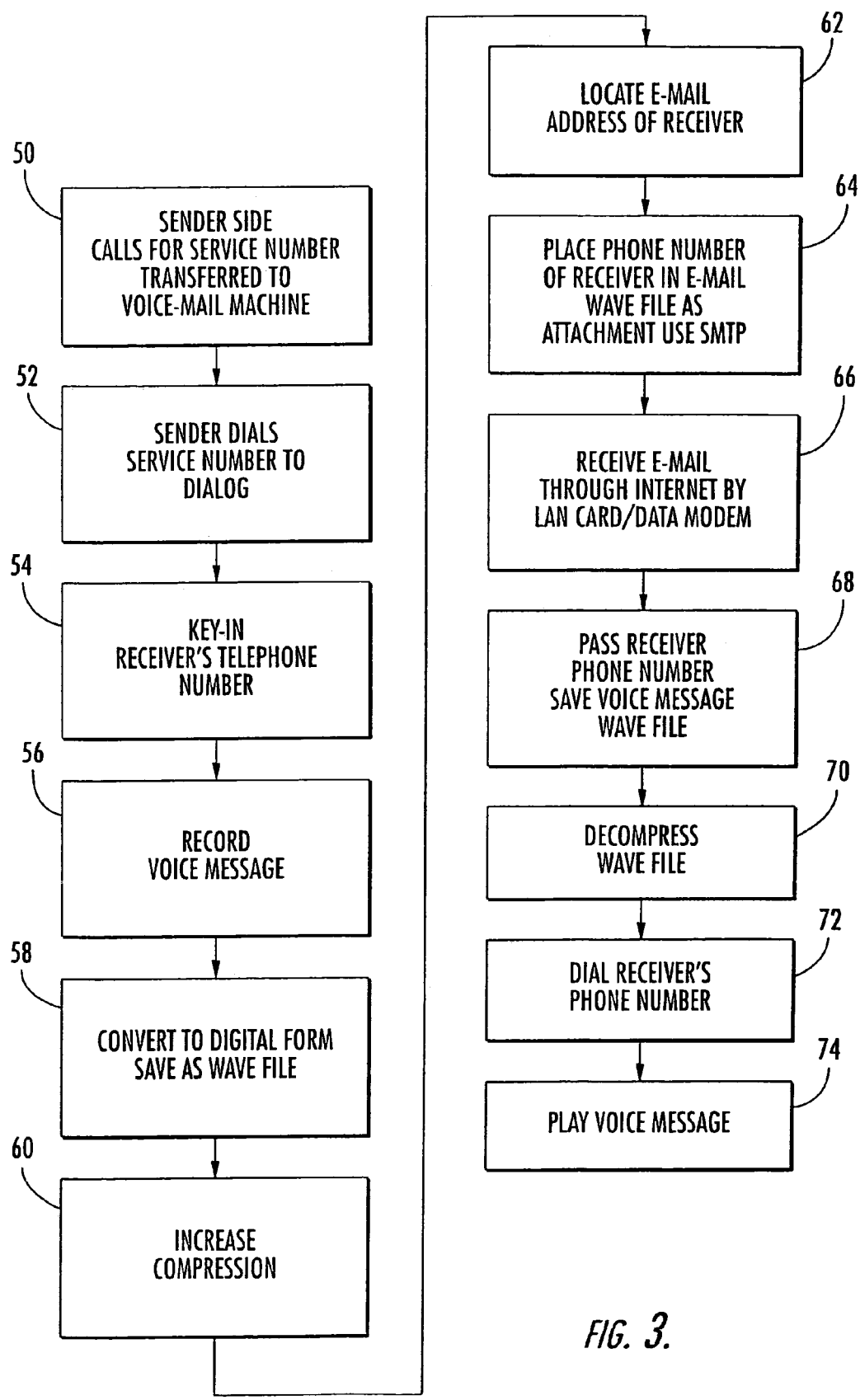
FIG. 3 is a high level flow chart of the method of the present invention using the system shown in FIG. 1.

Referring now to the flow chart in FIG. 3, basic operation of the method of the present invention is described. On the sender's side, calls for a special service number are transferred to the voice-mail machine 14 by the switch 44 (block 50). Subscribers (senders) 12 dial the special service number to dialog with the machine (block 52). The first software module 32 on the machine asks the sender to key in the receiver's telephone number with the country and/or local codes (block 54). After that, the sender is prompted by sound to start recording a voice message (block 56). This message is converted by the voice card/modem 40 to digital form, processed, and saved as a wave file by the second software module 34 (block 58). The system filters the sound first to increase the compression off-rate (block 60). The sound is also compressed based on the international standard μ-law, and a lossless compression by prediction is based on a recursive least square algorithm as will be explained in greater detail below.

The third software module 36 finds the corresponding e-mail address of the receiver 22 (block 62). The fourth software module 38 places the receiver's phone number in the e-mail and the voice message wave file as an attachment (block 64). It also sends this e-mail based on the SMTP protocol.

On the receiver's side, the voice-mail machine 18 receives the e-mail through the internet 16 by a LAN card or data modem 42 (block 66). The fourth software module 38 passes the receiver's phone number and saves the voice message wave file (block 68). The second software module 34 decompresses the wave file (block 70). The first software module 32 controls the voice card/modem 40 to dial the receiver's phone number (block 72). After receiving the reply from the receiver 32, the voice-mail machine plays the voice message through the voice card/modem 40 (block 74).

The system of the present invention using the voice-mail machines 14,18 can also include functions such as (a) maintaining security/piracy by providing a password; (b) calling a receiver at given time to avoid time differences between the sender and receiver; and (3) multi-casting the voice message to several receivers.

Details of the recursive least square algorithm that can be used in the present invention are found in the article authored by Dawei Huang entitled, "Lossless Compression For Mμ-Law (A-Law) and IMA ADPCM on the Basis of a Fast RLS Algorithm," the disclosure which is hereby incorporated by reference in its entirety.

The recursive least square algorithm and run length coding method allows lossless compression for μ-law (A-law) standard. Lossless compression means that for a given original input, exactly the same output is generated as that of the standards, while reducing the bit rates of compressed files. To maintain quality, the same quantization methods are used as in the μ-law (A-law) standard. To reduce bit rates, prediction and entropy coding techniques are used. The prediction is based on a fast recursive least square (RLS) algorithm that requires less computation than existing RLS algorithms The entropy coding is based on Huffman coding and the prediction, quantization and encoding are integrated into an adaptive scheme. The same quality is maintained while reducing the bit rates per sample. Comparing the eight-bit per sample μ-law or A-law, it is possible to use only 3.24 bits per sample for coding of an audio signal with 44,100 Hz sampling frequency and 4.72 bits for speech/audio signals at 11025 Hz. Some improvements for IMA ADPCM standard are also obtained.

By way of background, μ-law and A-law in the ITU (CCITT) G.711 were introduced in 1972 for telephony communications. As noted before, the encoding standard converts 16 bits per sample digital speech/audio signals into 8 bits per sample by a logarithmic formula. μ-law (A-law) has been used for long distance calls and international calls as the international standard.

Modern compression techniques use three approaches as known to those skilled in the art: prediction, quantization and entropy coding. In μ-law and A-law, algorithm formula provides the quantization steps. The logarithmic law takes the human perception into account. It also converts a Laplacian distribution, which has a sharp peak around zero, of the original signals into a much more flat distribution. So the unified coding scheme (8 bits for all 256 states) already closes to the optimal entropy coding. The RLS algorithm has been known by those skilled in he art for some time. It is superior than some simple prediction methods, such as Linear Mean Square (LMS). It is not as popular as LMS, however, because of its computational complexity. The present invention dramatically reduces the RLS algorithm's complexity.

The recursive least square algorithm uses an integrated scheme of prediction, quantization and entropy coding. This scheme uses the same quantization methods as that in the standards while reducing the bit rates by more sophisticated prediction and entropy coding methods. In contrast to the lossless compression method for more conventional PCM, the scheme is adaptive. In some prior art, differences were used in 256 sample blocks for prediction. The coefficients of the AR models are calculated by the data in the block and are fixed within each block. Both the coefficients and the residuals are coded for storage or transmission.

In the recursive least square algorithm that can be used in the present invention, the residual is calculated by the previous predictor. The predictor is updated based on the observation up to that time. There is no requirement for coding the prediction coefficients. As long as the past signal in the decoding side is the same as that in the encoding side, the system can synchronize the next signal and the next predictor in both encoding and decoding sides. The benefit of this method is that the system can use a large number of the coefficients in the predictor without increasing the code length. Since a voice signal has a long dependence, especially for the CD quality sound with 44,100 Hz sample frequency, the long regression increases the efficiency of the prediction and then reduces the bit rates for coding the residuals.

A windows platform program can be used on the basis of these algorithms. It can encode and decode the speech/audio signals on-line and in real time for up to 44,100 samples per second (CD standard) on a notebook computer with Pentium 233 kHz CPU.

This windows based platform with μ-law, A-law and IMA ADPCM compression programs as the engine can be written in Visual C++. This software can download, play, encode, decode and reproduce sound with wave format. Results for various samples are presented in the following table. The audio samples were taken from music compact disks for symphony, songs, etc. The speech/audio samples are broadcasting of Voice of America, down loaded from the Internet, with possible music background.

| Samples Audio | Hz | Size (kBytes) | Bits per μ-law | Sample ADPCM4 |
|---|---|---|---|---|
| 1 | 44,100 | 21,189 | 2.70 | 2.59 |
| 2 | 44,100 | 6,306 | 3.09 | 2.69 |
| 3 | 44,100 | 7,529 | 3.27 | 2.73 |
| 4 | 44,100 | 14,077 | 3.33 | 3.04 |
| 5 | 44,100 | 23,224 | 3.35 | 2.74 |
| 6 | 44,100 | 12,536 | 3.48 | 2.69 |
| 7 | 44,100 | 18,907 | 3.53 | 2.79 |
| Average | | | 3.24 | 2.75 |
| Speech/Audio | | | | |
| 1 | 11,025 | 6,482 | 4.36 | 3.08 |
| 2 | 11,025 | 12,942 | 4.63 | 3.19 |
| 3 | 11,025 | 12,920 | 4.70 | 3.22 |
| 4 | 11,025 | 12,920 | 4.74 | 3.15 |
| 5 | 11,025 | 38,007 | 4.82 | 3.17 |
| Average | | | 4.72 | 3.17 |

From the table, it is evident that the software works better for audio because the audio samples are taken in 44,100 Hz. Their prediction is only for $1/44{,}100$ second ahead and is easier than that of speech samples in 11,025 Hz. Also, pure speech can be compressed easier than that in a music background. Also, the compression ratio for μ-law is higher than that for IMA ADPCM, possibly because the recovered signal of μ-law is easier to be predicted by RLS than that of IMA ADPCM.

Using recent developments in signal processing, one can improve established international standards for audio/speech compression in compression ratio without any distortion in quality.

As noted before, the present invention uses the voice-mail machines 14,18 and the four software modules 32,34,36,38 to provide one-way communication for service providers with a high Return Over Investment (ROI). This present invention extends the most successful application on the internet, the e-mail, to more widely used telephone terminals, including cellular phones and wire-line phones, allowing more people to use the system without computers. The present invention is especially suitable for Chinese and other Far East markets.

In comparison to long distance calls, international calls and VoIP, the system of the present invention does not mandate large investments. The fee for a voice e-mail can be about ⅕ to about 1/10 of that for VoIP and about 1/10 to about 1/30 of that for the standard international call in the Chinese telecom market.

The table below lists an estimate of current charging standards for Chinese long distance, international, and VoIP calls and it is evident from the table the beneficial advantages of the present invention:

| | |
|---|---|
| Long distance call in Main Land China | 0.7 RBM/Minute |
| VoIP* Long distance call in Main Land China | 0.3 RBM/Minute |
| Long distance call to HK, Marco and Taiwan | 2.0 RBM/Minute |
| VoIP Long distance call in Main Land China | 1.5 RBM/Minute |
| International call to US and Canada | 8.0 RBM/Minute |
| VoIP International call to US and Canada | 2.4 RBM/Minute |
| International call to other countries | 8.0 RBM/Minute |
| VoIP International call to other countries | 3.2 RBM/Minute |
| Local mobile phone call | 0.4 RBM/Minute |
| Roaming mobile phone call | 0.6 RBM/Minute |
| Long distance/International mobile call | Above plus the corresponding fees as fixed line call |

*VoIP fee does not include the local call charge, which is 0.18 RMB for the first 3 minutes then 0.11 RMB/Minute.
Exchange rate between US$ and RMB: 1 US$ = 8.27 RMB.

In comparison to text e-mail, the system of the present invention avoids keying characters. This is beneficial for Chinese users because of the complexity involved with Chinese characters.

The present invention is also advantageous because it facilitates easy roaming and does not request registration of the home agent and foreign agent for cellular phone roaming. It allows high quality voice in comparison to VoIP. The voice message delivered by the present invention has no break and delay. The voice quality is the same as the international standard μ-law encoding.

The system of the present invention also increases the efficiency of a wireless channel. A service provider can arrange the voice e-mail only if there is redundancy in the wireless channel, increasing the channel efficiency. Incoming text e-mail in a home account can also be delivered to a cellular phone.

As described before, the present invention provides inexpensive international and long distance one-way voice message delivery using ordinary telephone terminals In the first described aspect of the present invention, no substantial changes to the existing telecommunication system are necessary. The software is installed on several gateways, for example, personal computers and notebooks with voice modems in different countries and cities.

In a second aspect of the present invention, one-way voice e-mail is arranged from cellular phones in a two-way random access channel when there are redundant capacities to use expensive wireless resources. Usually, the mobile service providers can only use about 50% of the channel capacity because all communications in the existing systems are two-way. Requests in real-time are without delay and are random access. The emergency third generation facilities are even more expensive. A one-way voice message will be transmitted when there are redundant capacities in the wireless channels, i.e., in the low priority to the ordinary cellular communications. The service providers can attract both local and international/long distance users by this inexpensive but convenient service.

The basic idea of voice message over IP is conducting one-way voice communications to avoid complicated and/or uncontrollable two-way communications in packet switching systems. This idea can be extended to other aspects. It will play an important role for the coming Multimedia Message Service (MMS) (for example, www.nokia.com). Examples include adding voice message delivery function in the current and coming cellular phone systems to fully use the channel capacity and forwarding the content of e-mail and sending to office computers and home and mobile phones.

Figure 4:
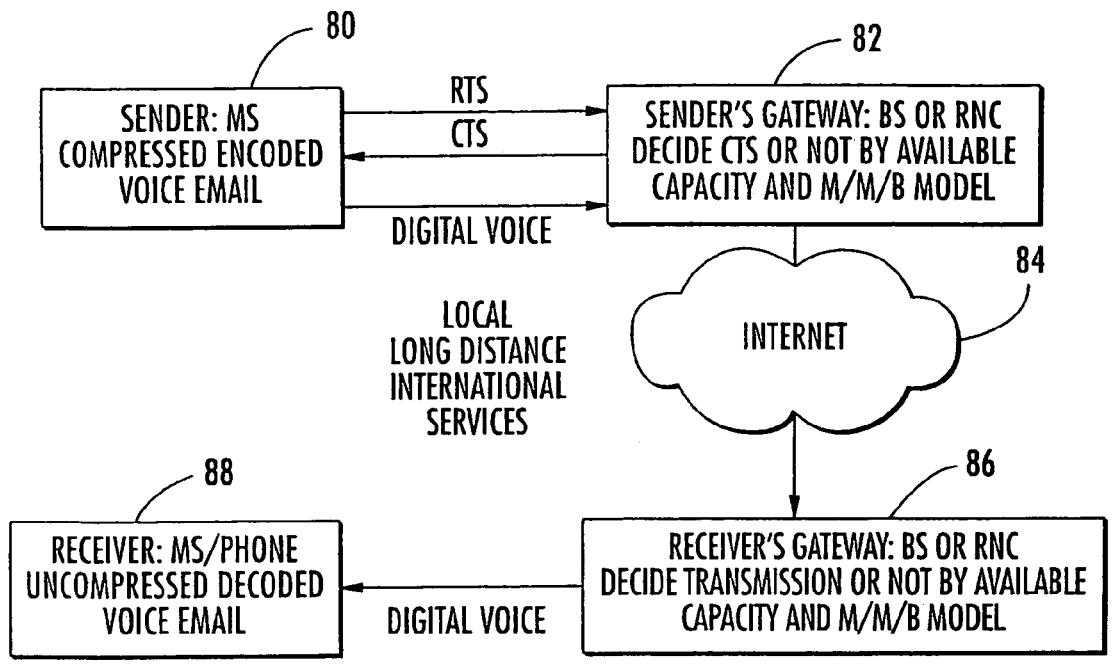
FIG. 4 is another embodiment of the present invention similar to FIG. 1, but showing the use of a mobile station and base station with a gateway.

FIG. 4 illustrates a block diagram for a second aspect of the present invention. In the figure, "MS" corresponds to mobile stations, such as cell phones and other wireless handsets (wireless PDA). "BS" corresponds to a base station in the GSM network, but could be other networks as suggested by those skilled in the art. "RNC" corresponds to radio network center in GPRS/UMTS. "RTS" is Request to Send and CTS" is Clear to Send. M/M/B is a Markovian queue with exponential inter-arrival time, exponential service times and B channels. Thus, the system decides whether to receive and/or forward any voice messages, typically one-way voice messages, on the basis of prediction of near future channel capacities by the queuing model in wireless network systems.

As illustrated, the sender 80 as a mobile station can have a compressed and encoded voice e-mail. A Request to Send and Clear to Send signals are forwarded and the digital voice forwarded to the sender's gateway 82 which could be a base station or radio network center with voice-mail machine functionality. The gateway 82 decides whether it is Clear to Send or not by available capacity and the M/M/B model. The message is sent over the internet 84 to the receiver's gateway 86, which can be a base station or radio network center, as known to those skilled in the art, having appropriate voice-mail machine functionality. It decides to transmit or not by available capacity and the M/M/B model. The digital voice is transmitted to the receiver mobile station or phone 88 as uncompressed decoded voice e-mail.

As known to those skilled in the art, entry into a waiting queue can be Markovian and can assume steady state and ignore non-FIFO criteria for waiting queues. Some of the entries can be done in a Poisson manner with rate delta and transaction time for various transactions exponentially distributed with an established mean.

Figure 5:
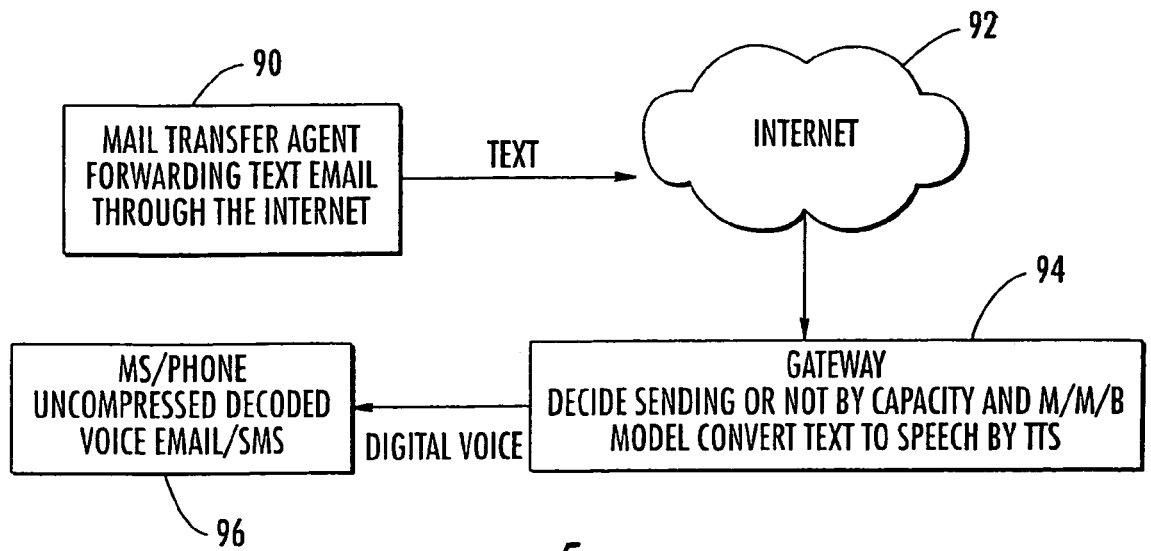
FIG. 5 is another block diagram, but showing a mail transfer agent in contact with the internet and the gateway of the present invention using text-to-speech conversion.

A third aspect of the present invention shown in FIG. 5 and provides service for obtaining e-mail from a subscriber's home account and listen to it by text-to-speech (TTS) or by short message service (SMS). Though some 2.5/3 generation mobile phones have the ability to obtain e-mail from a user's home account, these phones are usually expensive. Also, the GSM/IS95 systems will be working in the future for an extended time. Furthermore, fixed-line phones are still widely available and inexpensive. The present invention obtains e-mail by any ordinary phone, both cellular or fixed-line, on the basis of the text-to-signal technique developed by Language Modeling Department, Bell Labs. The TTS technique can also be used for more general services such as active mobile networks. It is also possible to deliver the e-mail through SMS if the e-mail is not too long.

As shown in FIG. 5, a mail transfer agent 90 forwards text e-mail through the internet 92 where the gateway 94 having voice-mail machine functionality then decides to send or not by (a) capacity and (b) the M/M/B model. The processor within the gateway converts text-to-speech by the TTS technique. The digital voice is then transferred to the mobile station/phone 96 as uncompressed decoded voice e-mail/SMS.

Basic algorithms for text-to-speech systems can be found in U.S. Pat. Nos. 5,751,907 to Moebius et al.; 5,790,978 to Olive et al.; and 6,272,464 to Kiraz et al., all commonly assigned to Lucent Technologies, the disclosures which are hereby incorporated by reference in their entirety.

It is well known that e-mail is one of the more challenging types of text for a text-to-speech synthesis system because plain text is often interspersed with other types of materials such as tables, itemized lists or artwork drawn with keyboard characters with rarely any formal device marking the boundaries between different regions. E-mail text also contains various types of embedded messages, forwarded material and quotations, which should be detected and set off to aid the listener in navigating the document. There are also many tradenames and electronic addresses that are not correctly treated by a TTS system.

In one system developed by Lucent Technologies, the conversion from written text to speech (text-to-speech synthesis, TTS) can be broken down into three major tasks: linguistic analysis, prosodic modeling, and speech synthesis. Speech synthesis transforms a given linguistic representation, e.g., a chair of phonetic symbols enriched by information on phrasing, intonation and stress, into artificial, machine-generated speech by means of an appropriate synthesized method. Text analysis modules compute the linguistic representation from written text.

The TTS system architecture can function as a synthesizer for multiple languages. There are current working systems for English, French, Spanish, Italian, German, Russian, Romanian, Chinese and Japanese. The system is multilingual in the sense that the underlying software for both linguistic analysis and speech synthesis is identical for all languages, with the exception of English. Some language-specific information is necessary; there are acoustic inventories unique to each language and there are also special rules for linguistic analysis. These data, however, are stored externally in tables and parameter files, and are loaded by the TTS engine at run-time. Thus, in applications such as dialog or e-mail reading, it is possible to switch voices and languages as desired at run-time.

The multilingual character of the system can be compared to a text processing program that allows the user to edit text in almost any language by providing language-specific fonts. The same underlying principles and options concerning text formatting or output are applied disregarding the language currently being processed. The unified software architecture for multilingual text-to-speech synthesis facilitates an expansion to new languages, and its modular structure enhances the integration of improved components for an existing system.

As is known to those skilled in the art, languages such as Chinese do not mark work boundaries and a system must "reconstruct" such boundaries. Other languages, like Russian, have extremely complex morphology which must be dealt with, since morphology in Russian affects stress placement. In addition, different languages often use different writing systems. In Chinese, the system must deal with Chinese-character text, whereas in Russian, one must deal with strings of Cyrillic characters. It is possible, however, to take a more abstract view: each linguistic analysis problem can be thought of as a transduction of one string of symbols (e.g., orthographic characters) into another string of symbols (e.g. an annotated linguistic analysis).

The transduction of symbol strings can be modeled computationally based on finite stat transducers (FSTs). An FST can be characterized as an abstract machine that contains a finite number of states. For each state the transition to other states is controlled by a table, depending upon which input symbols are being processed. The table also determines the output symbols. Linguistic descriptions, such as pronunciation rules, produced by an expert can be automatically compiled into FSTs. In weighted FSTs (WFSTs) weights (or costs) may be added to arcs, enabling a ranking of alternative analyses. The best analysis of a set of alternatives can then be selected.

It is also possible to use prosodic modeling where the segmental duration module assigns a duration to each phonetic segment. Given the string of segments to be synthesized, each segment is tagged with a feature vector containing information on a variety of factors, such as segment identity, syllable stress, accent status, segmental context, or position in the phrase. An important requirement is that the factors can be computed from text. Construction of the duration model is performed in two phases: inferential-statistical analysis of the speech corpus, and parameter fitting. The system can apply a quantitative duration model that is implemented as a particular instantiation of a "sums-of-products" model whose parameters are fitted to a segmented speech database. This approach uses statistical techniques that are able to cope with the problem of confounding factors and factor levels, and with data sparsity. The analysis yields a comprehensive picture of durational characteristics of one particular speaker.

The intonation module computes a fundamental frequency contour (F0) by adding three types of time-dependent curves: a phrase curve, which depends on the type of phrase, e.g., declarative vs. interrogative; accent curves, one for each accent group (accented syllable followed by zero or more non-accented syllables) and perturbation curves, which capture the effects of obstruents on pitch in the post-consonantal vowel. This approach shares some concepts with the so-called superpositional intonation models. The system can model in detail how the accent curves depend on the composition and duration of the accept groups. This is important because listeners are sensitive to small changes in alignment of pitch peaks with syllables. Previous findings on segmental effects of timing and height of pitch contours are integrated in the new model. Similar to duration module construction, modeling these dependencies involves fitting of parameters to a speech corpus.

The system can generate synthetic speech by concatenating segments of natural speech. The majority of units in the acoustic inventory are diphones, i.e., units that contain the transition between two adjacent phonetic segments, starting in the steady-state phase of the first segment and ending in the stable region of the second segment. Units to be stored in the acoustic inventory are chosen based on various criteria that include spectral discrepancy and energy measures.

Contextual or coarticulatory effects can require the storage and use of context-sensitive "allophonic" units or even of triphones. For acoustic inventory construction, the system performs an automated optimal element selection and cut point determination. The approach selects elements such that for a given vowel, spectral discrepancies between elements for that vowel are jointly minimized, and the coverage of required elements is maximized. A toolset is provided that helps reduce the amount of manual labor involved in the selection of inventory elements Elements that have been selected for inclusion in the inventory are then extracted ("cut"),normalized in amplitude, indexed and stored in tales as acoustic inventory elements.

The unit selection and concatenation modules select and connect the acoustic inventory elements. These modules retrieve the necessary units, assign new durations, pitch contours and amplitude profiles and pass parameter vectors onto the synthesis module. Our TTS system uses vector-quantized LPC and a parametrized glottal waveform for synthesis.

The system can analyze an e-mail message by Emu decomposing it into the following notionally distinct phases: (i) analysis and parsing of text regions (markup), (ii) normalization of text content (device-independent rendering), and (iii) synthesis of the text (audio rendering).

The markup phase starts by trying to identify critical regions of text. In the case of headers, this is relatively easy since there are fairly reliable cues such as lines starting with From: or Subject". Other cases are more complex, such as distinguishing tables from plan text or from ASCII graphics. For the more complex cases, the system uses corpus-trained statistical ngram models of character-class (alphabetic symbols, numbers, and predefined classes of non-alphanumeric symbols) to produce a weighted ranking of the various possible classes for a given line of text. Each line would receive a score for how strongly it matches a canonical line of a table, an ASCII graphic, a signature, or a piece of plain text. A block of text is defined to be (roughly) any region delimited by one or more blank lines. For each block, the system imposes the further restriction that all lines in a block belong must to the same class. The system selects for the block the class that has the best score. After the regions have been detected, they are parsed into a hierarchical document structure, where each node in the hierarchy is labeled with a tag and attributes, following the model of SGML.

Device-independent rendering attempts to normalize various kinds of non-standard text material, including e-mail addresses, URL's, mixed case trade terms such as WinNT, for example, the e-mail address brsnyder@netcom.com. The "@" should be read as "at" (rather than, e.g., "at sign"), and the "." should be read as "dot" (rather than being skipped). Furthermore, the handle brsnyder should be broken up as b r snyder. This normalization is accomplished using a finite stat transducer that knows about the structure of electronic addresses. Embedded in this transducer is a corpus-trained finite-state model of well formed English words. This model will detect that brsnyder is unlikely to be an orthographically sensible word and will propose that it be split into b r snyder.

The final phase, audio rendering, starts with the marked up and normalized text, and inserts appropriate tags into the text for controlling how the Bell Labs American English TTS system will speak the text. The rendering phase will decide, among other things, on which voice from a pre-defined suite of voices to use for, e.g., a quoted region, so that when a quoted region has been detected, TTS will switch to this voice, thus, helping the listener better understand the structure of the document.

It is evident that the present invention is advantageous and provides a system and method where users have the ability to send long distance and international voice messages through the internet to receivers, while overcoming the drawbacks of the prior art. A voice-mail machine of the present invention allows subscribers to send these long distance and international voice messages to receivers through the internet without using computers directly. The system is inexpensive, convenient, mobile and has high quality audio in the voice communications. It provides a one-way communication system. Standard phone calls can be used by both a sender and receiver with local connections to voice-mail machines. In one aspect of the present invention, the message can be sent between two voice-mail machines of the present invention by e-mail.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of forwarding voice messages from a sender to a receiver through a network comprising the steps of:
   recording at a first voice-mail device a phone number of a receiver and a voice message of the sender within a digital file;
   encapsulating, by the voicemail device, the voice message and phone number within an e-mail;
   forwarding the e-mail from the first voice-mail device to a first voice-mail gateway through a network and then to a second voice-mail device through another network;
   opening the e-mail to obtain the phone number of the receiver and the voice message;
   predicting near future channel capacities of the voice-mail gateway based on a queuing model and determining a time at which to deliver the voice message, after the predicting, so as to avoid time differences between the sender and the receiver; and
   dialing the phone number of the receiver and delivering the voice message to the receiver via a cellular telephone network at the determined time.

2. The method according to claim 1 wherein, voice-mail device comprises a telephone switch.

3. The method according to claim 1 wherein, at least one of the first voicemail device and second voice-mail device comprise a cellular base station or radio network center.

4. The method according to claim 1 further comprising the step of forwarding a voice message to a receiver as digital voice.

5. The method according to claim 1 further comprising the step of forwarding the e-mail through the network using the Simple Mail Transfer Protocol.

6. The method according to claim 1 further comprising the step of recording the voice message at the first voice-mail device as a wave file.

7. The method according to claim 1 further comprising the step of forwarding an e-mail using a mail transfer agent.

8. The method according to claim 7 further comprising the step of forwarding text from the mail transfer agent via an internet.

9. The method according to claim 1 wherein, at least one of the first voicemail device and second voice-mail device is operative for
   a) prompting and receiving a dial tone;
   b) recording and playing a voice message;
   c) locating an e-mail address; and
   d) sending and receiving the e-mail.

10. The method according to claim 1 further comprising the step of compressing a voice message at the first voice-mail device using a recursive least square algorithm and a run length coding method.

11. The method according to claim 1 further comprising the step of compressing a voice message using a recursive least square algorithm.

12. A method of forwarding voice messages from a mobile station sender to a receiver through a network comprising the steps of:
   recording, at a first voice-mail device, a phone number of a receiver and a voice message of the sender within a digital file via the mobile station;
   encapsulating, by the voicemail device, the voice message and phone number within an e-mail;
   deciding whether to forward the e-mail to a first voice mail gateway based on predicted channel capacities, the predicted channel capacities being based on a queuing model in wireless network systems;
   forwarding the e-mail from the voice mail device to the first voice-mail gateway through a network;
   sending the e-mail from the first voice-mail gateway to a second voice mail device through another network;
   opening the e-mail to obtain the phone number of the receiver and the voice message; predicting near future channel capacities of the voice-mail gateway based on the model;
   determining a time to deliver the voice message, after the predicting; and
   dialing the phone number of the receiver and delivering the voice message to the receiver via a telephone network at the determined time.

13. A system for forwarding voice messages from a sender to receiver through a network comprising a voice-mail device operative as a gateway within a network for receiving a voice message and phone number from a sender via a telephone network, said voice-mail device being operative for:
   a) prompting and receiving a dial tone;
   b) recording and playing a voice message;
   c) locating an e-mail address;
   d) encapsulating the voice message and the phone number within an e-mail;
   e) opening the e-mail to obtain a phone number of the receiver and the voice message;
   f) predicting near future channel capacities of the voice-mail gateway based on a queuing model;
   g) determining a time at which to send the voice message to a receiver, after the predicting, so as to avoid time differences between a sender and the receiver;
   g) sending and receiving the e-mail to the receiver via at least two networks, a first of the two networks being an internet and a second of the at least two networks being a telephone network.

14. The system according to claim 13, wherein the telephone network is a public switched telephone network.

15. The system according to claim 13, wherein the telephone network is a cellular telephone network.

16. The system according to claim 13, wherein the voice-mail device comprises a telephone switch.

17. The system according to claim 13, wherein the voice-mail device comprises a cellular base station or radio network center.

18. The system according to claim 13, wherein the voice-mail device is operative for recording and playing a voice message as a WAV file.

19. The system according to claim 13, wherein the voice-mail device is operative for forwarding one-way voice messages on the basis of predicted channel capacities based on a queuing model in wireless network systems.

20. The system according to claim 13 further comprising a mail transfer agent for forwarding an e-mail.

21. The system according to claim 13, wherein the voice-mail device is operative for forwarding an e-mail through the internet using the Simple Mail Transfer Protocol.

22. The system according to claim 13, wherein a voice-mail device indicates a processor for text-to-speech conversion.

23. The system according to claim 13, wherein the voice-mail device includes a processor for compressing a voice message using a recursive least square algorithm.

24. A method of forwarding voice messages from a sender to a receiver through a network comprising the steps of:
  recording at a first voice-mail device a phone number of the receiver and a voice message of the sender within a digital file via a mobile device;
  encapsulating, by the voice-mail device, the voice message and phone number within an e-mail;
  deciding whether to forward the e-mail from the first voice-mail device to a first voice-mail gateway;
  forwarding the e-mail from the first voice-mail device to the first voice-mail gateway through a first network;
  sending the e-mail from the first voice-mail gateway to to a second voice-mail device through a second network, at least one of the first and second networks being a wireless network;
  opening the e-mail to obtain the phone number of the receiver and the voice message;
  predicting near future channel capacities based on a queuing model in a wireless network;
  determining a time at which to deliver the voice message based on the predicted near future channel capacities and so as to avoid time differences between the sender and the receiver; and
  delivering the voice message at the determined time.

25. A method of forwarding a voice message from a mobile station sender to a receiver through a wireless network comprising the steps of:
  opening an e-mail having a voice message and a phone number of a receiver encapsulated, therein, to obtain the phone number and the voice message, the phone number and voice message having been recorded, at a first voice-mail device, within a digital file by the mobile station sender, and encapsulated by the voice-mail device;
  determining a time at which to send the voice message to the receiver based on predicted near future channel capacities and so as to avoid time differences between the sender and the receiver, the predicted channel capacities being predicted based on a queuing model for a wireless network; and
  sending the voice message to the receiver via a wireless network using the phone number at the determined time.

26. A system for transferring voice messages from a mobile station sender to a receiver through a network comprising:
  a first voice-mail device operative as a gateway within a network for receiving a voice message and phone number from a sender via a wireless network, said voice-mail device including,
    a recorder that records a phone number of a receiver and a voice message of the mobile station sender within a digital file;
    an encapsulator that encapsulates the voice message and the phone number within an e-mail; and
    a message forwarder that forwards the e-mail from the first voice-mail device through a wireless network to a second voice-mail device; wherein
      the first voice-mail device decides whether to forward the e-mail based on predicted channel capacities, the predicted channel capacities being based on a queuing model in wireless network systems, and
      the second voice-mail device opens the e-mail to obtain the phone number of the receiver and the voice message, predicts near future channel capacities of the voice-mail gateway based on the model, determines a time to deliver the voice message based on the predicted near future channel capacities and so as to avoid time differences between the sender and the receiver, and dials the phone number of the receiver and delivering the voice message to the receiver via a telephone network at the determined time.

27. A system for receiving a voice message from a sender through a network comprising:
  an e-mail opener that opens, from the sender, an e-mail having a voice message and a phone number of a receiver encapsulated, therein, to obtain the phone number and the voice message, the phone number and voice message having been recorded, at the sender, within a digital file via a mobile station, and encapsulated by the sender prior to sending; and
  a dialer that dials the phone number of the receiver and sends the voice message to the receiver via a wireless network; wherein
    the system is further configured to predict near future channel capacities of a voice-mail gateway based on the model, determine a time to deliver the voice message based on the predicted near future channel capacities and so as to avoid time differences between the sender and the receiver, wherein
    the dialer dials the phone number of the receiver and delivers the voice message to the receiver via a telephone network at the determined time.

* * * * *